(12) United States Patent  (10) Patent No.: US 8,579,062 B2
Niewoehner et al.  (45) Date of Patent: Nov. 12, 2013

(54) FUEL TANK

(75) Inventors: Jens Niewoehner, Rutesheim (DE);
Alexander Kiessling, Leonberg (DE);
Werner Speck, Vaihingen/Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 288 days.

(21) Appl. No.: 13/029,260

(22) Filed: Feb. 17, 2011

(65) Prior Publication Data

US 2011/0240389 A1  Oct. 6, 2011

(30) Foreign Application Priority Data

Mar. 31, 2010 (DE) .......................... 10 2010 016 252

(51) Int. Cl.
*B60K 15/00* (2006.01)
(52) U.S. Cl.
USPC ....................................................... 180/69.4
(58) Field of Classification Search
USPC ............... 180/69.4; 280/834; 220/562, 62.22, 220/62.19, 62.15; 428/441, 457, 461, 516
See application file for complete search history.

(56) References Cited

U.S. PATENT DOCUMENTS

| 4,895,268 | A | * | 1/1990 | Hyde ............................ 220/694 |
| 4,909,530 | A | * | 3/1990 | Tsukada et al. ............... 180/296 |
| 4,930,811 | A | * | 6/1990 | Tsukada et al. ............... 280/834 |
| 5,020,687 | A | * | 6/1991 | Seizert .......................... 220/645 |
| 5,067,575 | A | * | 11/1991 | Hyde et al. ................... 180/69.4 |
| 5,188,981 | A | * | 2/1993 | Stiles et al. ................. 428/309.9 |
| 5,344,038 | A | * | 9/1994 | Freeman et al. ........... 220/62.22 |
| 5,496,069 | A | * | 3/1996 | Milligan ....................... 280/830 |
| 5,674,603 | A | * | 10/1997 | Stiles et al. ................ 428/306.6 |
| 5,813,491 | A | * | 9/1998 | Sato et al. ..................... 180/309 |
| 6,099,042 | A | * | 8/2000 | Cook et al. .................... 280/834 |
| 6,401,961 | B1 | * | 6/2002 | Butler ........................... 220/562 |
| 6,554,152 | B2 | * | 4/2003 | Smith ....................... 220/560.01 |
| 6,661,339 | B2 | * | 12/2003 | Muirhead ..................... 220/562 |
| 6,857,537 | B2 | * | 2/2005 | Yonezawa ..................... 220/562 |
| 6,875,258 | B2 | * | 4/2005 | Kuperus ........................ 220/562 |
| 7,497,207 | B2 | * | 3/2009 | Lahn et al. .................... 123/497 |
| 7,497,290 | B2 | * | 3/2009 | Marsala et al. .............. 180/69.1 |
| 2004/0191542 | A1 | * | 9/2004 | McLeod et al. .............. 428/461 |

FOREIGN PATENT DOCUMENTS

| DE | 102 59 468 | 7/2004 |
| DE | 103 40 952 | 4/2005 |
| DE | 10 2004 044 057 | 3/2006 |
| DE | 10 2008 036 894 | 2/2010 |
| JP | 57-140226 | 8/1982 |
| WO | 99/44851 | 9/1999 |

* cited by examiner

*Primary Examiner* — J. Allen Shriver, II
*Assistant Examiner* — James M Dolak
(74) *Attorney, Agent, or Firm* — Gerald E. Hespos; Michael J. Porco; Matthew T. Hespos

(57) ABSTRACT

A fuel tank of a motor vehicle is mounted on a body structure of the motor vehicle via fastening elements. The fuel tank has a glass fiber reinforced shaped plastic part (12) as heat shield that at least partially covers a surface of the fuel tank and is mounted with the fuel tank on the body structure of the motor vehicle via the fastening elements.

8 Claims, 1 Drawing Sheet

FUEL TANK

CROSS REFERENCE TO RELATED APPLICATION

This application claims priority under 35 USC 119 to German Patent Application No 10 2010 016 252.3 filed on Mar. 31, 2010, the entire disclosure of which is incorporated herein by reference.

BACKGROUND OF THE INVENTION

1. Field of the Invention

The invention relates to a fuel tank and to a motor vehicle with a fuel tank.

2. Description of the Related Art

DE 103 40 952 A1 discloses a motor vehicle with a passenger compartment delimited at the front by a first transverse wall structure and at the rear by a second transverse wall structure. A drive assembly of the motor vehicle is mounted behind the second transverse wall structure. The motor vehicle disclosed in DE 103 40 952 A1 also has a fuel tank fastened to the second rear transverse wall structure by fastener straps. The fuel tank of the motor vehicle of DE 103 40 952 A1 protrudes into the rear part that receives the drive assembly. Thus, the fuel tank is exposed to the heat emitted by the drive assembly. As a result, the fuel tank and the fuel in the fuel tank are heated.

Heating fuel is disadvantageous, since heated fuel impairs the degree of efficiency of the drive assembly. The prior art has no simple solutions for preventing the heating of the fuel in the fuel tank.

An object of the invention is to provide a fuel tank and a motor vehicle with a fuel tank that prevents heating the fuel in the fuel tank.

SUMMARY OF THE INVENTION

The invention relates to a fuel tank with a glass fiber reinforced shaped plastic heat shield that at least partially covers and nest with a surface of the fuel tank and, together with the fuel tank, can be mounted on the body structure of the motor vehicle via the fastening elements for the fuel tank.

A glass fiber reinforced shaped plastic part is assigned to the fuel tank as a heat shield. The glass fiber reinforced shaped plastic part covers and nests with a surface of the fuel tank at least partially and, together with the fuel tank, is mounted on the body structure of the motor vehicle via the fastening elements. The glass fiber reinforced shaped plastic part that functions as the heat shield is lightweight and provides a large surface area with sufficient rigidity. Therefore, the shaped plastic heat shield can be mounted on the body structure via the fastening elements that are present in any case for mounting the fuel tank on the body structure of the motor vehicle. As a result, no separate fastening elements are required for mounting the shaped plastic heat shield, thereby ensuring a simple construction.

The glass fiber reinforced shaped plastic part preferably covers and nests with at least a surface of the fuel tank that faces a heat source. Additionally, the surface of the glass fiber reinforced shaped plastic part that faces the heat source preferably is coated metallically. The metallic coating on the surface of the shaped plastic part that faces the heat source increases the heat shield action of the shaped plastic part.

The glass fiber reinforced shaped plastic part preferably has a multiple layer construction, namely a first layer and a second layer made from plastic and a third layer made from glass fiber reinforced plastic positioned between the first and second layers. Either the first layer or the second layer faces the heat source and carries the metallic coating. The multiple layer construction of the shaped plastic part as a sandwich component is advantageous for rigidity.

The shaped plastic part that acts as a heat shield preferably has a contour that is adapted and conforms to the contour of the surface of the fuel tank that is to be covered by the shaped plastic part. This permits a space saving integration of the shaped plastic part that acts as heat shield into the motor vehicle. Tolerances in the fuel tank that occur, for example, during production, can be taken into consideration by a corresponding geometrical allowance in the shaped plastic part.

DETAILED DESCRIPTION OF THE PREFERRED EMBODIMENT

Figure 1:
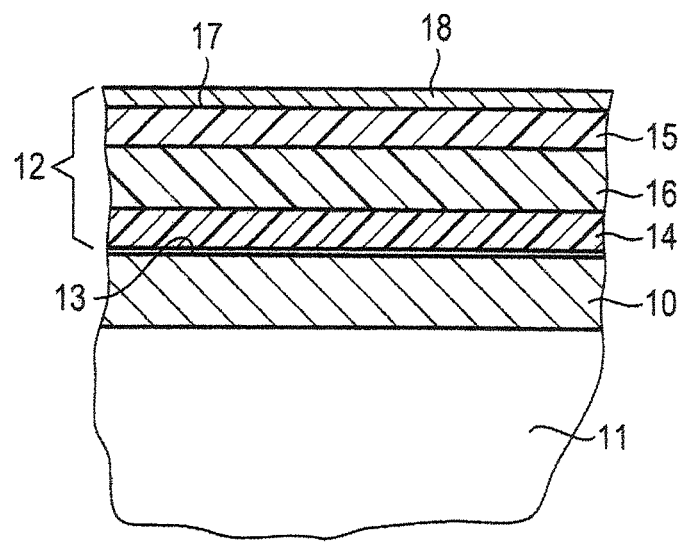
FIG. 1 is a diagrammatic, cross section of a detail through a fuel tank according to the invention.

A fuel tank FT of a motor vehicle MV in accordance with the invention has a wall 10 that delimits an inner space 11 of the fuel tank FT. Fuel is provided in the inner space 11 of the fuel tank FT and can be fed to a drive assembly DA of the motor vehicle MV via fuel lines (not shown).

The fuel tank FT of the motor vehicle MV can be mounted on a body structure of the motor vehicle MV via fastening elements FE. The fastening elements are configured as fastener straps, but can be lug-shaped clamping elements.

A fuel tank FT positioned adjacent to the drive assembly DA or adjacent to another heat source, such as an exhaust gas system, necessarily is exposed to great heat due to the heat dissipation of the heat source. As a result, the fuel in the fuel tank FT ultimately is heated. However, fuel preferably is fed at a low temperature to a drive assembly for reasons of efficiency. Thus, heating fuel in the fuel tank FT is not desired.

The invention assigns the fuel tank FT of a motor vehicle a glass fiber reinforced shaped plastic part 12 as heat shield that at least partially covers, nest with and conforms to a surface 13 of the wall 10 of the fuel tank FT.

The glass fiber reinforced shaped plastic part 12 that functions as heat shield preferably covers such a surface 13 of the fuel tank FT that faces a heat source, for example the drive assembly DA, of the motor vehicle.

The shaped plastic part 12 that acts as heat shield reduces heating of the fuel tank FT brought about by convection and/or radiation and therefore reduces heating the fuel in the fuel tank FT. As a result, it is possible to supply a drive assembly with fuel at a lower temperature and thus to increase the degree of efficiency. In addition, the material of the fuel tank FT is protected reliably against excessively high temperatures.

The heat shield that is configured as a glass fiber reinforced shaped plastic part 12 can be mounted, together with the fuel tank FT, on the body structure of the motor vehicle via the fastening elements FE for the fuel tank FT. Accordingly, the heat shield that is configured as a glass fiber reinforced shaped plastic part 12 can be mounted on the body structure of the motor vehicle MV via the fastening elements FE for the fuel tank that are present in any case and preferably are configured as fastener straps or lug-shaped clamping elements. As a result no separate fastening elements are required for mounting the heat shield or shaped plastic part 12.

The heat shield that is configured as a glass fiber reinforced shaped plastic part 12 preferably has a contour that conforms to the contour of the surface 13 of the fuel tank FT that is to be covered by the shaped plastic part 12. As a result, a particularly space saving integration of the heat shield into the motor vehicle MV together with the fuel tank FT is possible.

The glass fiber reinforced shaped plastic part 12 preferably has a multiple layer construction and accordingly preferably is configured as a sandwich component. The glass fiber reinforced shaped plastic part 12 that forms the heat shield preferably has first, second and third layers 14, 15 and 16. The first and second layers 14 and 15 preferably are made from plastic, most preferably from a thermoplastic. The third layer 16 is made from glass fiber reinforced plastic, in particular from glass fiber reinforced thermoplastic, and is positioned between the first and second layers 14 and 15. The thermoplastic preferably is polypropylene.

As described above, the glass fiber reinforced shaped plastic part 12 that functions as heat shield at least partially covers and nest with a surface 13 of the fuel tank FT that faces a heat source. The glass fiber reinforced shaped plastic part 12 is coated metallically, for example with aluminum, on a surface 17 that faces the heat source. Thus, the heat shield action of the shaped plastic part 12 can be increased.

Figure 2:
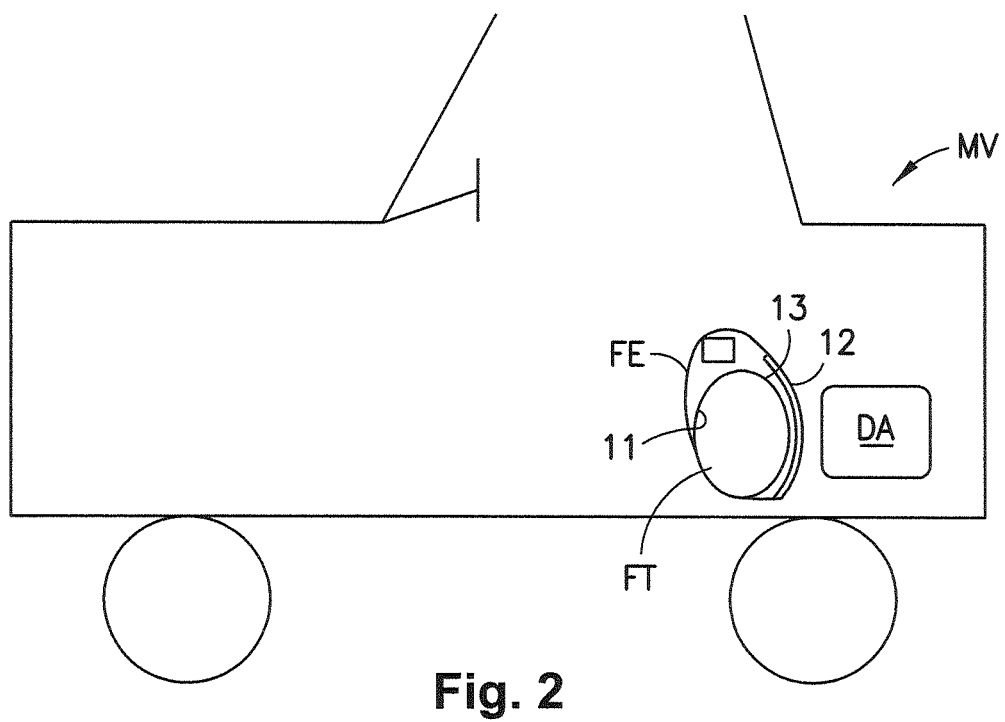
FIG. 2 is a schematic cross sectional view of a motor vehicle with a fuel tank in accordance with the invention.

The shaped plastic part 12 preferably is coated with the metallic coating 18 either on the first layer 14 or on the second layer 15, each of which is a thermoplastic, preferably via an aluminum foil that is bonded adhesively to the corresponding surface of the shaped plastic part. In FIG. 2, the metallic coating 18 is applied to the second layer 15 that faces the heat source.

The glass fibers of the glass fiber reinforced shaped plastic part 12 preferably are distributed uniformly as endless fibers and are embedded in the plastic in a nondirectional manner, into the third, middle layer 16 of the shaped plastic part 12 in the exemplary embodiment of FIG. 1.

What is claimed is:

1. A fuel tank of a motor vehicle, the fuel tank having a specified three dimensional shape, a glass fiber reinforced shaped plastic heat shielding part conforming to at least part of the three dimensional shape of the fuel tank so that the heat shielding part nests with and at least partially covers a surface of the fuel tank facing a heat source on the motor vehicle, the heat shielding part having a metallic coating on a surface of the heat shielding part facing away from the fuel tank and, fastening elements holding the heat shielding part nested together with the fuel tank and mounted on a body structure of the motor vehicle.

2. The fuel tank of claim 1, wherein the glass fiber reinforced shaped plastic part has first and second layers made from plastic and a third layer made from glass fiber reinforced plastic located between the first and second layers, the first layer or the second layer carrying the metallic coating.

3. The fuel tank of claim 2, wherein the plastic is a thermoplastic and the metallic coating is aluminum.

4. The fuel tank of claim 2, wherein the glass fiber reinforced shaped plastic has glass fibers distributed uniformly therein and embedded in a nondirectional manner.

5. A motor vehicle comprising:
a heat generating component;
a body structure component in proximity to the heat generating component;
a fuel tank in proximity to the heat generating component and the body structure component, the fuel tank having a specified contour;
a heat shield shaped to conform substantially to at least a portion of the fuel tank facing the heat generating component and nested over the portion of the fuel tank facing the heat generating component, the heat shield including a glass fiber reinforced shaped plastic part between the heat generating component and the fuel tank and a metal layer on a surface of the heat shield facing the heat generating component; and
at least one fastening strap holding the heat shield in nested relationship to the fuel tank and mounting both the fuel tank and the heat shield on the body structure component.

6. The motor vehicle of claim 5, wherein the glass fiber reinforced shaped plastic has opposite surfaces and the heat shield includes layers of thermoplastic on the opposite surfaces of the glass fiber reinforced shaped plastic.

7. The motor vehicle of claim 6, wherein the metal layer is an aluminum foil adhesively bonded to one of the layers of thermoplastic.

8. The motor vehicle of claim 5, wherein the heat generating component is a drive assembly of the motor vehicle.

* * * * *